(12) United States Patent
Tseng et al.

(10) Patent No.: US 7,319,583 B2
(45) Date of Patent: **\*Jan. 15, 2008**

(54) ELECTRONIC DEVICE WITH POSITIONING UNIT

(75) Inventors: Hua-Chung Tseng, Taipei Hsien (TW); Shu-Hsien Chu, Taipei Hsien (TW); Cheng-Shing Luo, Taipei Hsien (TW); Chu-Hsian Chian, Taipei Hsien (TW); Yang-Po Chiu, Taipei Hsien (TW)

(73) Assignee: Wistron Corporation, Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/481,602

(22) Filed: Jul. 5, 2006

(65) Prior Publication Data

US 2006/0278778 A1 Dec. 14, 2006

Related U.S. Application Data

(62) Division of application No. 10/661,282, filed on Sep. 12, 2003, now Pat. No. 7,100,876.

(30) Foreign Application Priority Data

Nov. 11, 2002 (TW) ............................. 91218068 U

(51) Int. Cl.
*G06F 1/16* (2006.01)

(52) U.S. Cl. ................. 361/681; 248/917; 248/921
(58) Field of Classification Search ............... 248/917, 248/922, 923, 919, 921, 183.2, 183.1; 361/681, 361/683; 312/223.1, 223.2; 403/112–113, 403/164–165; 345/169; 292/137, 163, 150, 292/302, DIG. 63, DIG. 37; 16/324, 326
See application file for complete search history.

(56) References Cited

U.S. PATENT DOCUMENTS

| | | | |
|---|---|---|---|
| 6,587,333 B2 | 7/2003 | Tseng et al. ................ 361/681 |
| 6,694,570 B2 | 2/2004 | Chen ........................... 16/367 |
| 6,742,221 B2 | 6/2004 | Lu et al. ...................... 16/367 |
| 6,867,961 B2 | 3/2005 | Choi ........................... 361/681 |
| 7,100,876 B2 * | 9/2006 | Tseng et al. ............. 248/125.9 |
| 2003/0052857 A1 | 3/2003 | Peppas ....................... 345/156 |

* cited by examiner

*Primary Examiner*—Gwendolyn Baxter
(74) *Attorney, Agent, or Firm*—Ladas & Parry, LLP

(57) ABSTRACT

An electronic device includes first and second housings which are pivoted to each other, and a spring-biased stopper mounted movably on an upper wall of the first housing. The stopper is movable in a transverse direction relative to the upper wall between an engaging position, in which the stopper projects outwardly of the first housing through the upper wall and engages the second housing, and a second position, in which the stopper is received in the first housing and disengages from the second housing.

1 Claim, 12 Drawing Sheets

ELECTRONIC DEVICE WITH POSITIONING UNIT

CROSS-REFERENCE TO RELATED APPLICATIONS

This patent application is a divisional application of U.S. Ser. No. 10/661,282, filed on Sep. 12, 2003, now U.S. Pat. No. 7,100,876 which claims priority to Taiwanese Application No. 091218068, filed on Nov. 11, 2002.

BACKGROUND OF THE INVENTION

1. Field of the Invention

This invention relates to a portable electronic device with a positioning unit.

2. Description of the Related Art

FIG. 1 illustrates a conventional notebook computer 1 including a main board module 11, a display module 12 with a screen, and a pivot-and-positioning assembly 13 coupled to rear ends of the main board and display modules 11, 12 so as to permit rotation of the display module 12 relative to the main board module 11 about a first axis (X) and about a second axis (Z) that is perpendicular to the first axis (X).

A pair of spring-biased auxiliary positioning members 14 (only one is shown) are respectively provided to interconnect the main board and display modules 11, 12 to enhance positioning of the display module 11. Each of the auxiliary positioning members 14 is mounted movably on a respective side of the main board module 11, and engages releasably a respective side of the display module 12. A releasing member 142 is provided to disengage each auxiliary positioning member 14 from the display module 12.

The conventional notebook computer is disadvantageous in that the display module 12 tends to rub undesirably against the auxiliary positioning members 14 during rotation about the second axis (Z). Moreover, if the display module 12 is misaligned with the main board module 11 during closing of the notebook computer, the screen of the display module 12 may undesirably strike against one of the auxiliary positioning members 14 and be damaged.

SUMMARY OF THE INVENTION

Therefore, it is an object of the present invention to provide an electronic device with a positioning unit that is capable of overcoming the aforementioned drawbacks of the prior art.

According to this invention, there is provided an electronic device that comprises a first housing having an upper wall and a rear end, the upper wall being formed with a pivot-mounting hole adjacent to the rear end of the first housing; a pivot unit being rotatably mounted in the first housing and including a rotatable part that projects upwardly through the pivot-mounting hole and that is rotatable relative to the first housing about a first axis which extends in a transverse direction relative to the upper wall of the first housing; a second housing having a rear end that is pivoted to the rotatable part so as to be rotatable relative to the first housing about a second axis which is perpendicular to the first axis and so as to be rotatable together with the rotatable part about the first axis relative to the first housing between opposite first and second angular positions; a positioning unit mounted in the first housing and including a spring-biased stopper that is disposed adjacent to the rotatable part, and that is movable in the transverse direction relative to the first housing between an engaging position, in which the stopper moves upwardly to engage one of the rotatable part and the rear end of the second housing when the second housing is positioned at one of the first and second angular positions, thereby preventing rotation of the rotatable part and the second housing about the first axis, and a disengaging position, in which the stopper moves downwardly to disengage from the one of the rotatable part and the rear end of the second housing, thereby permitting rotation of the second housing and the rotatable part about the first axis; and an urging member for urging the stopper to move to the engaging position.

BRIEF DESCRIPTION OF THE DRAWINGS

In drawings which illustrate embodiments of the invention.

DETAILED DESCRIPTION OF THE PREFERRED EMBODIMENTS

Figure 1:
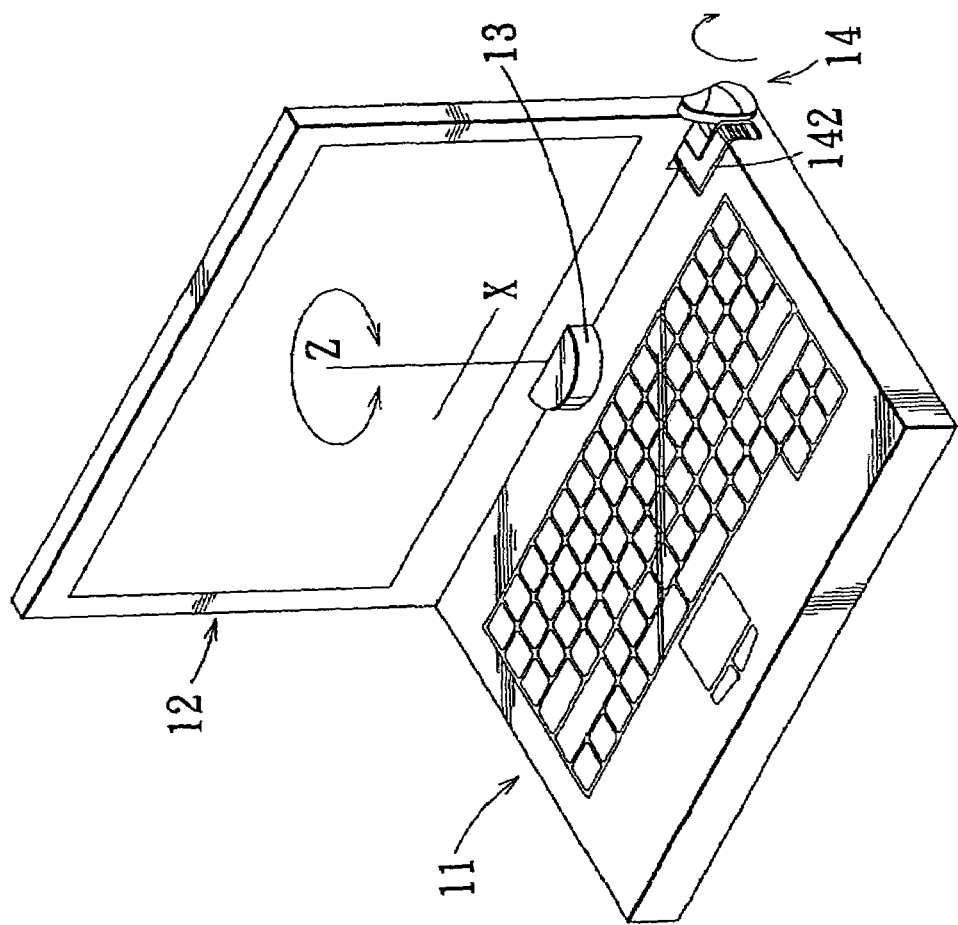
FIG. 1 is a perspective view of a conventional notebook personal computer with a pivot-and-positioning assembly.

For the sake of brevity, like elements are denoted by the same reference numerals throughout the disclosure.

FIGS. 2 to 6 illustrate a first preferred embodiment of an electronic device, such as a notebook computer 2, according to this invention. The notebook computer 2 includes: a main board module with a first housing 3 having an upper wall 30 and a rear end 301, the upper wall 30 being formed with a pivot-mounting hole 302 adjacent to the rear end 301 of the first housing 3; a rotatable part 41 that is mounted rotatably in the first housing 3, that projects upwardly through the pivot-mounting hole 302, and that is rotatable relative to the first housing 3 about a first axis (Z) which extends in a transverse direction relative to the upper wall 30 of the first housing 3; a display module with a second housing 4 having two opposite side faces 45, 46, and a rear end 40 that is pivoted to the rotatable part 41 through a pivot 411 (see FIG. 4) so as to be rotatable relative to the first housing 3 about a second axis (X) which is perpendicular to the first axis (Z) and so as to be rotatable together with the rotatable part 41 about the first axis (Z) relative to the first housing 3 between a first angular position, in which the side face 45 of the second housing 4 faces frontwardly and the side face 46 faces rearwardly, and a second angular position, in which the side face 45 faces rearwardly and the side face 46 faces frontwardly, the rear ends 301, 40 of the first and second housings 3, 4 being substantially parallel to each other when the second housing 4 is positioned at one of the first and second angular positions; a positioning unit 5 mounted in the first housing 3 and including a spring-biased stopper 51 that is disposed adjacent to the rotatable part 41, and that is movable in the transverse direction relative to the first housing 3 between an engaging position (see FIGS. 3 and 4), in which the stopper 51 moves upwardly to engage the rotatable part 41 (note that instead of engaging the rotatable part 41, the stopper 51 can engage the rear end 40 of the second housing 4 in order to achieve the same function) when the second housing 4 is positioned at one of the first and second angular positions, thereby preventing rotation of the rotatable part 41 and the second housing 4 about the first axis (Z), and a disengaging position (see FIG. 5), in which the stopper 51 moves downwardly to disengage from the rotatable part 41, thereby permitting rotation of the second housing 4 and the rotatable part 41 about the first axis (Z); and a first urging member 52 including a pair of coil springs 521 (see FIG. 6) for urging the stopper 51 to move to the engaging position.

The stopper 51 projects through the pivot-mounting hole 302, and has an engaging end 516 with an end face 5160 that extends outwardly of the pivot-mounting hole 302 in the transverse direction and that faces rearwardly. The rotatable part 41 has two opposite engaging ends 412 (only one is shown) each of which has an end face 4120 that conforms to and that is in face-to-face contact with the end face 5160 of the engaging end 516 of the stopper 51 when the stopper 51 is positioned at the engaging position and when the second housing 4 is positioned at one of the first and second angular positions.

Figure 7:
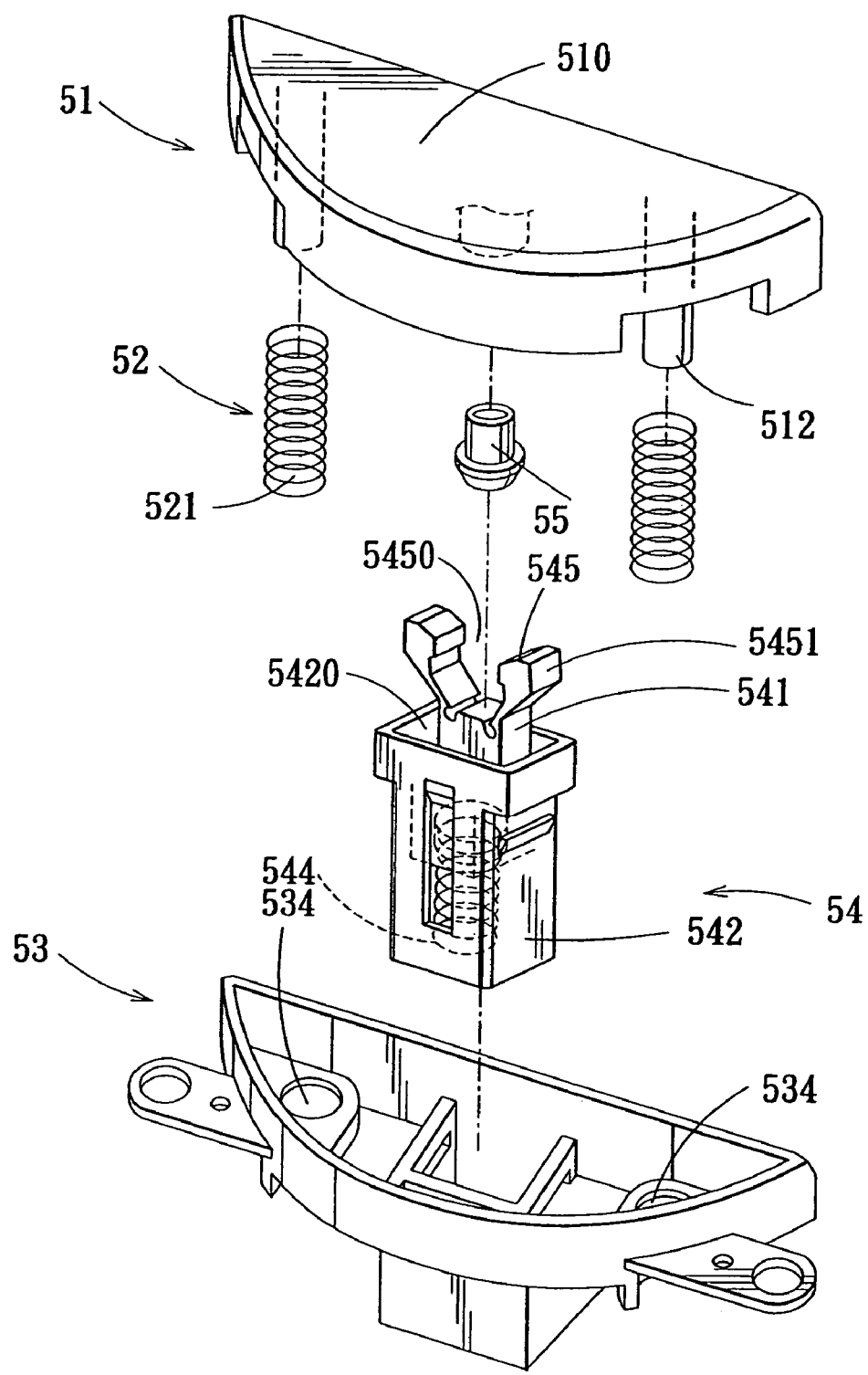
FIG. 7 is an exploded perspective view of a second preferred embodiment of the electronic device according to this invention, which includes a catch unit with a latch projecting from the stopper shown in FIG. 3 to position the stopper at an engaging position.
Figure 8:
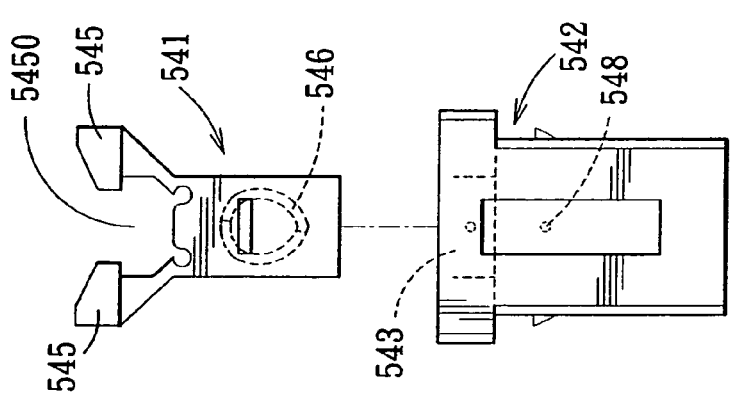
FIG. 8 is an exploded side view of the catch unit shown in FIG. 7.

FIGS. 7 and 8 illustrate a second preferred embodiment of the notebook computer 2 according to this invention, which has a structure similar to the first embodiment shown in FIG. 2, except that the positioning unit 5 further includes a seat 53 that is mounted securely in the first housing 3 below the stopper 51 and that is formed with a pair of through-holes 534. The stopper 51 includes a base plate 510 that is exposed from the pivot-mounting hole 302 and that extends in a lateral direction relative to the upper wall 30 of the first housing 3, and a pair of posts 512 extending downwardly from the base plate 510 through the through-holes 534, respectively. Each of the coil springs 521 is sleeved around a respective one of the posts 512, and abuts against a periphery of a respective one of the through-holes 534 and the base plate 510.

Figure 10:
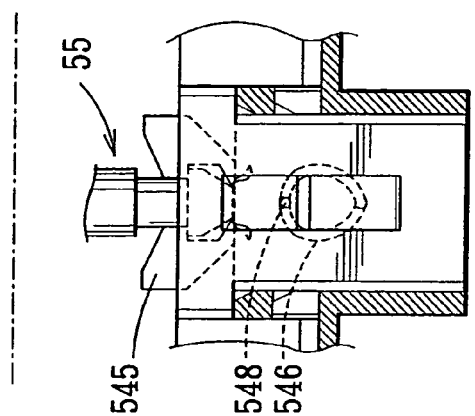
FIG. 10 is a fragmentary sectional view illustrating how the clamping arms of the catch unit disengage from the latch shown in FIG. 9.
Figure 9:
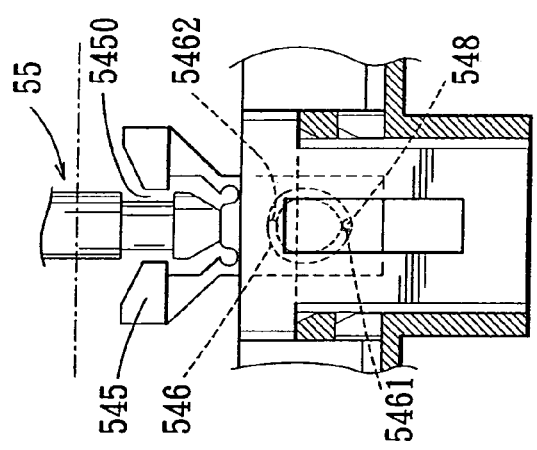
FIG. 9 is a fragmentary sectional view illustrating how a pair of clamping arms of the catch unit engage the latch shown in FIG. 7.

The positioning unit 5 further includes a catch unit 54 mounted on the seat 53 between the through-holes 534 and including a casing 542 that is formed with an upper opening 5420, and a spring biased catch 541 mounted slidably in the casing 542 and formed with a pair of elastic clamping arms 545. A second urging member 544 is disposed in the casing 542 for urging the catch 541 to move upwardly away from the upper opening 5420. The clamping arms 545 cooperate with each other to define a clamping space 5450 therebetween, and have opposite end faces 5451 that are spaced apart from each other by a width greater than that of the upper opening 5420 in the casing 542. The stopper 51 further includes a latch 55 that extends downwardly from the base plate 510 into the clamping space 5450 and that abuts against the catch 541. The catch 541 is slidable between a catch position (see FIG. 10), in which the clamping arms 545 move into the casing 542 through the upper opening 5420, and are pressed by the casing 542 to move elastically toward each other to clamp the latch 55 when the stopper 51 is moved downwardly to the disengaging position, thereby preventing upward movement of the stopper 51 to the engaging position, and a release position (see FIG. 9), in which the clamping arms 545 are moved out of the casing 542 by urging action of the second urging member 544 and are released from the casing 542 to move elastically away from each other to release the latch 55, thereby permitting upward movement of the stopper 51 to the engaging position. The catch 541 is formed with a generally heart-shaped groove 546 defined by a groove-defining wall and having a first end and a second end that is opposite to the first end and that is disposed adjacent to the clamping arms 545. The groove-defining wall is formed with first and second steps 5461, 5462 at the first and second ends of the heart-shaped groove 546, respectively. The casing 542 is formed with a boss 548 that slidably engages the heart-shaped groove 546 in such a manner that the boss 548 engages the first step 5461 of the groove-defining wall and is prevented from moving along the heart-shaped groove 546 when the catch 541 is disposed at the release position and that the boss 548 engages the second step 5462 of the groove-defining wall and is prevented from moving along the heart-shaped groove 546 when the catch 541 is disposed at the catch position, thereby retaining the catch 541 on the casing 542 and controlling movement of the catch 541 relative to the casing 542.

Figure 2:
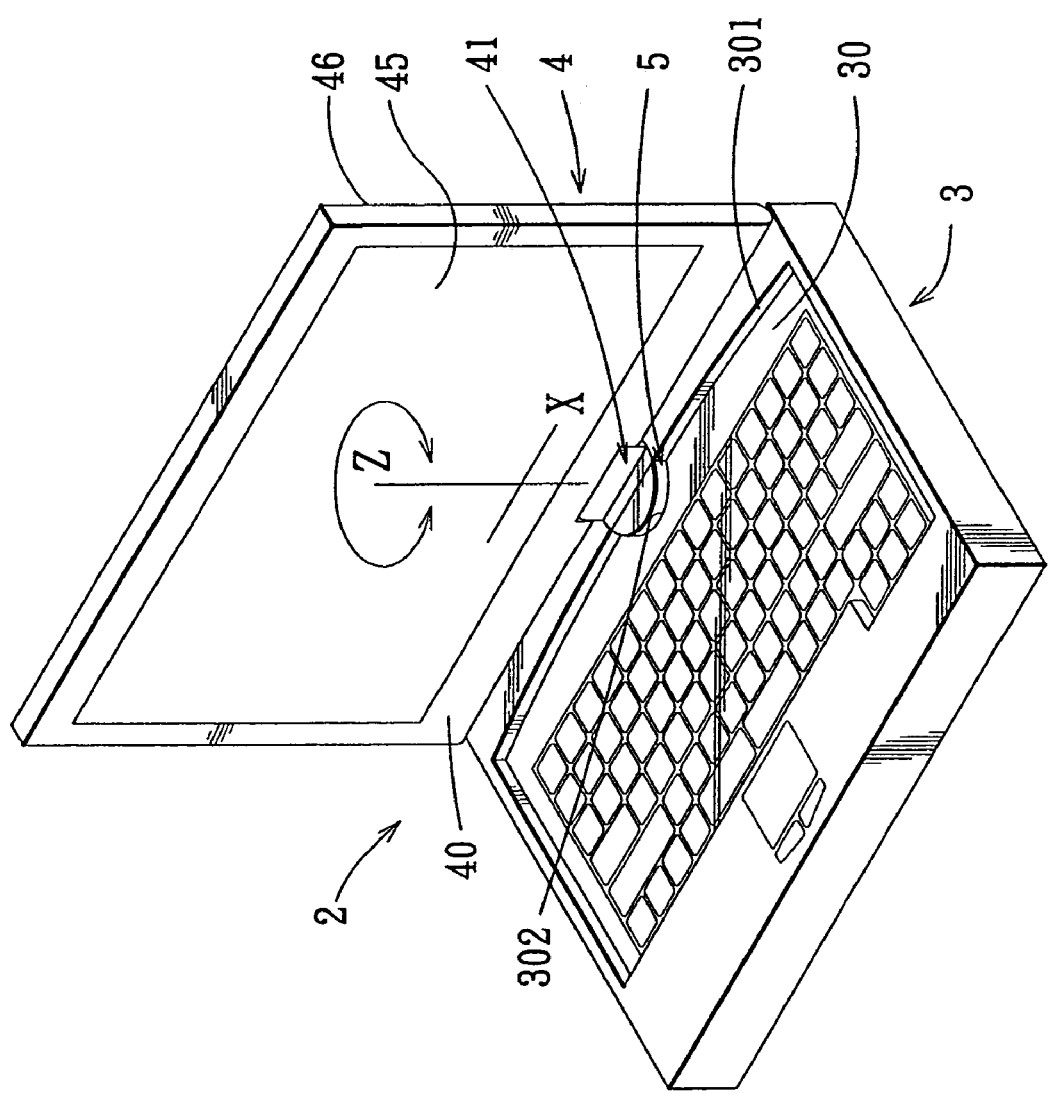
FIG. 2 is a perspective view of a first preferred embodiment of a notebook computer with a pivot-and-positioning assembly according to this invention.
Figure 3:
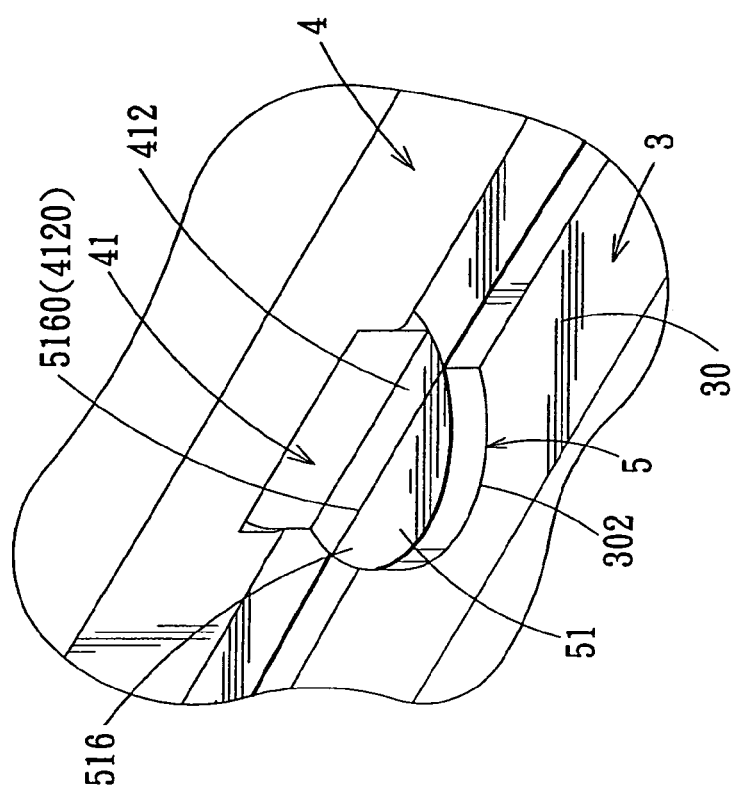
FIG. 3 is a fragmentary perspective view illustrating how a stopper engages a rotatable part of the pivot-and-positioning assembly shown in FIG. 2.
Figure 4:
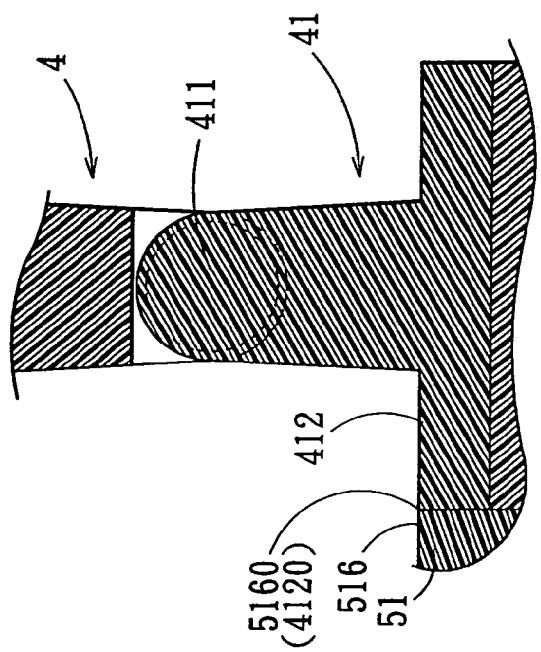
FIG. 4 is a fragmentary sectional view illustrating the engagement between the stopper and the rotatable part shown in FIG. 3.
Figure 6:
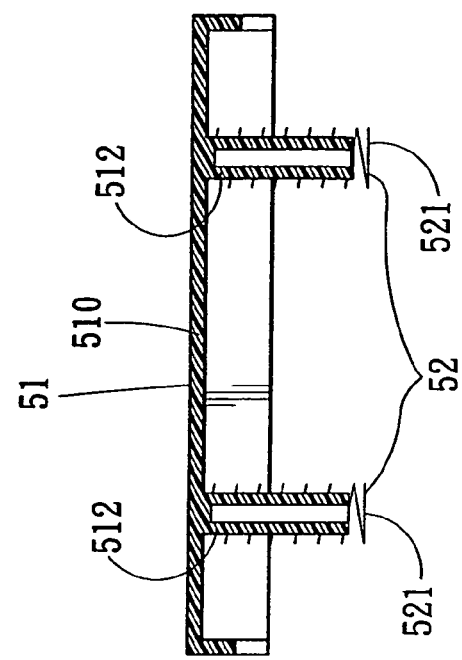
FIG. 6 is a sectional view of the stopper shown in FIG. 3.
Figure 5:
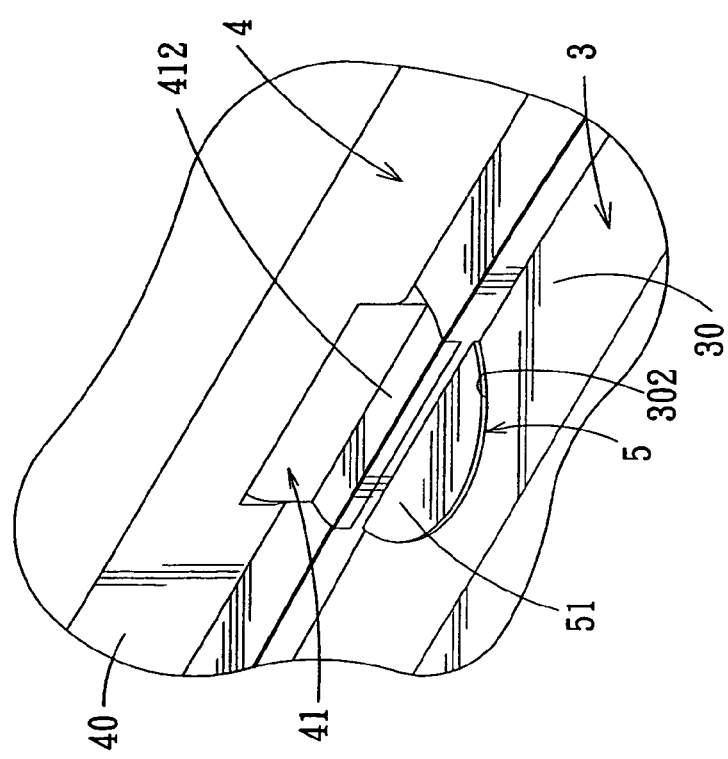
FIG. 5 is a fragmentary perspective view illustrating how the stopper disengages from the rotatable part of the pivot-and-positioning assembly shown in FIG. 2.
Figure 12:
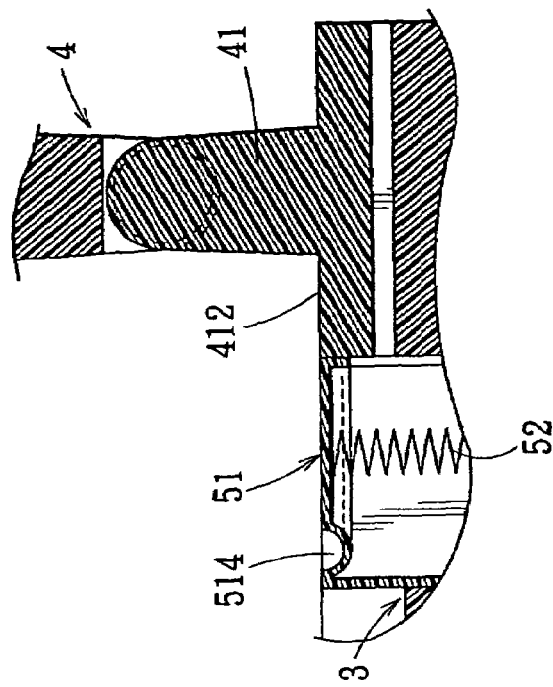
FIG. 12 is a fragmentary sectional view to illustrate how the guide disengages from the arcuate guiding groove shown in FIG. 11.
Figure 11:
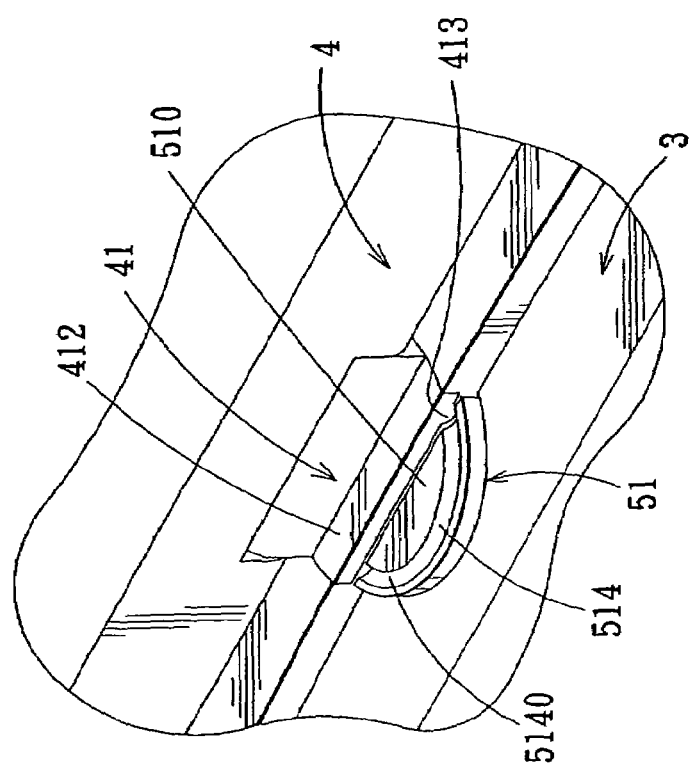
FIG. 11 is a fragmentary perspective view of a third preferred embodiment of the notebook computer according to this invention, which includes a guide protruding from the rotatable part and engageable with an arcuate guiding groove formed in the stopper shown in FIG. 3.
Figure 13:
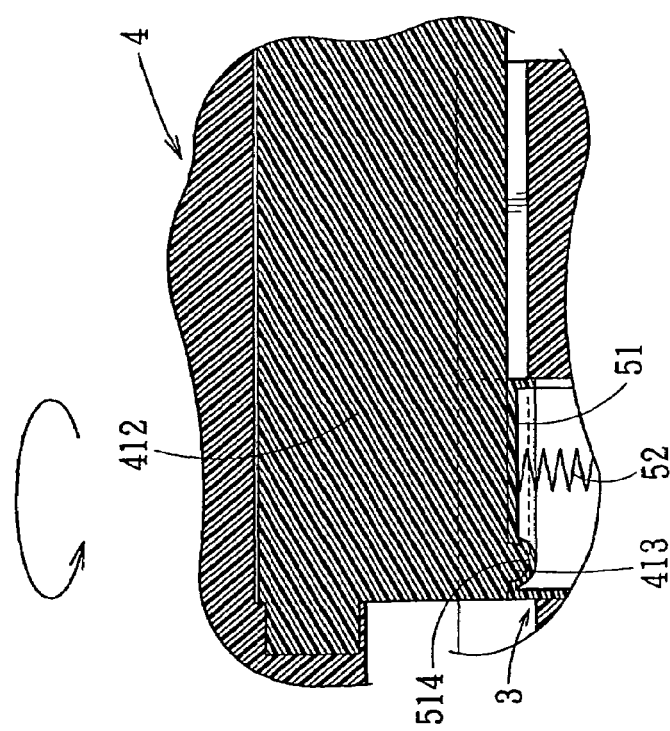
FIG. 13 is a fragmentary sectional view to illustrate how the guide engages the arcuate guiding groove shown in FIG. 11.

FIGS. 11 to 13 illustrate a third preferred embodiment of the notebook computer 2 according to this invention, which has a structure that is similar to the first embodiment shown in FIG. 2, except that the base plate 510 of the stopper 51 is formed with an arcuate guiding groove 514 that opens upwardly and that has two opposite ends 5140. The rotatable part 41 is formed with a pair of opposing guides 413 that protrude downwardly from an adjacent one of the engaging ends 412 of the rotatable part 41 and that are laterally and respectively aligned with the opposite ends 5140 of the guiding groove 514 (see FIG. 11) when the stopper 51 is positioned at the disengaging position so as to permit receiving of one of the guides 413 into the guiding groove 514 (see FIG. 13) during rotation of the second housing 4 together with the rotatable part 41 about the first axis (Z), thereby facilitating rotation of the second housing 4 from one of the first and second angular positions to the other of the first and second angular positions.

Figure 14:
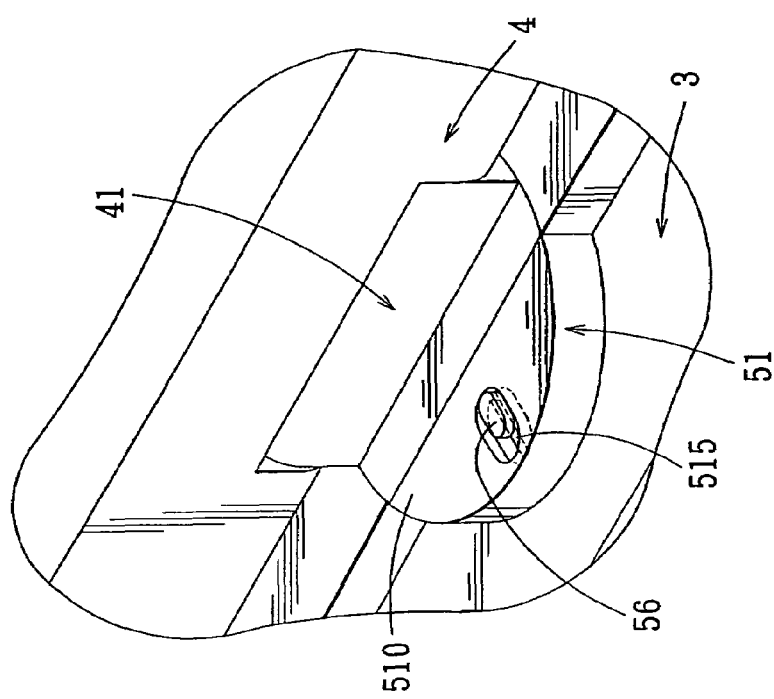
FIG. 14 is a fragmentary perspective view of a fourth preferred embodiment of the notebook computer according to this invention, which includes a latch mounted slidably on the stopper shown in FIG. 3.
Figure 16:
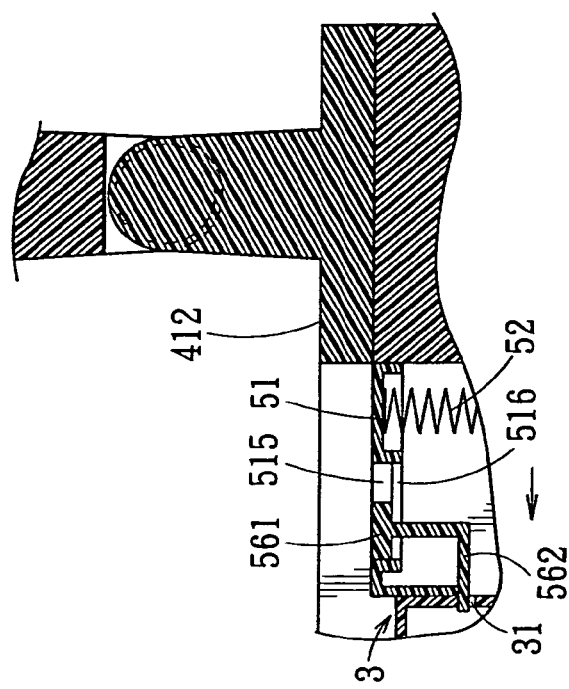
FIG. 16 is a fragmentary sectional view illustrating how the latch of FIG. 14 disengages from the latch hole shown in FIG. 15.
Figure 15:
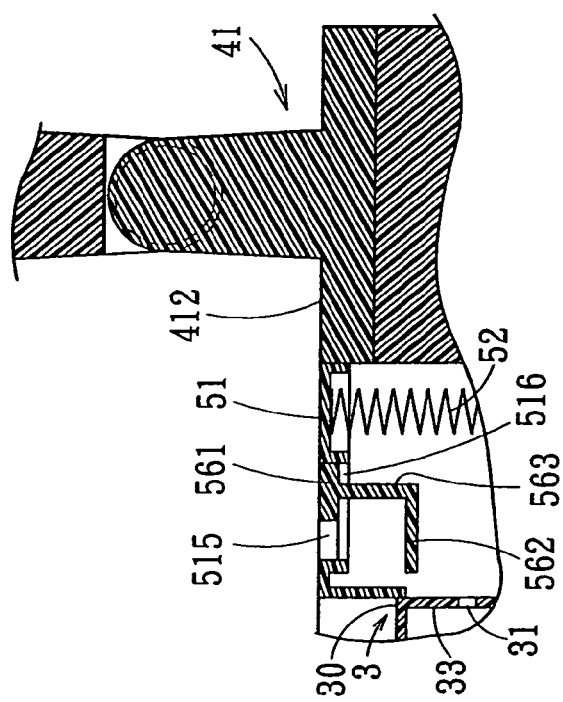
FIG. 15 is a fragmentary sectional view illustrating how the latch of FIG. 14 engages a latch hole in a lug secured to a housing of the notebook computer of FIG. 3.

FIGS. 14 to 16 illustrate a fourth preferred embodiment of the notebook computer 2 according to this invention, which has a structure that is similar to the first preferred embodiment shown in FIG. 2, except that the base plate 510 of the stopper 51 is formed with a recess 515 that opens upwardly and that is defined by a recess-defining wall which is formed with a laterally extending slit 516. The positioning unit 5 further includes a latch 56 that has a head 561 received in the recess 515 and spanning the slit 516, a shank 563 extending downwardly from the head 561 through the slit 516, and a tail 562 extending laterally from the shank 563. A lug 33 projects downwardly and inwardly from the upper wall 30 of the first housing 3, and is disposed adjacent to the latch 56. The lug 33 is formed with a latch hole 31. The latch 56 is slidable along the length of the slit 516 between a locking position (see FIG. 15), in which the tail 562 of the latch 56 moves into and engages the latch hole 31 when the stopper 51 is positioned at the disengaging position, thereby preventing upward movement of the stopper 51 to the engaging position, and an unlocking position (see FIG. 16), in which the tail moves away and disengages from the latch hole 31, thereby permitting upward movement of the stopper 51 to the engaging position.

Figure 18:
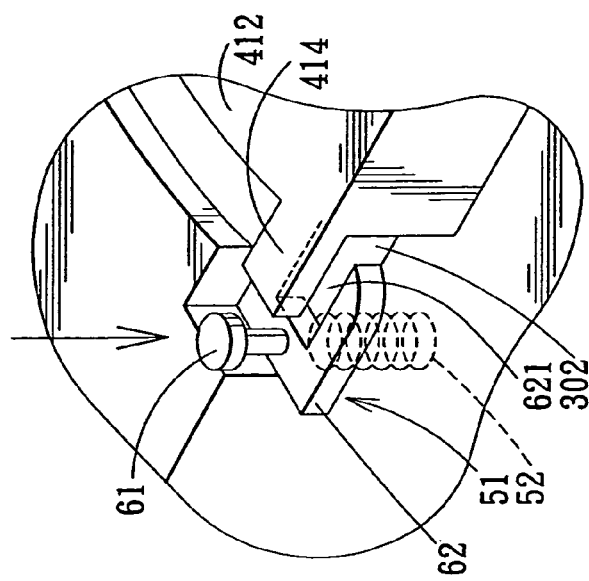
FIG. 18 is a fragmentary perspective view illustrating how the engaging groove disengages from the engaging tongue shown in FIG. 17.
Figure 17:
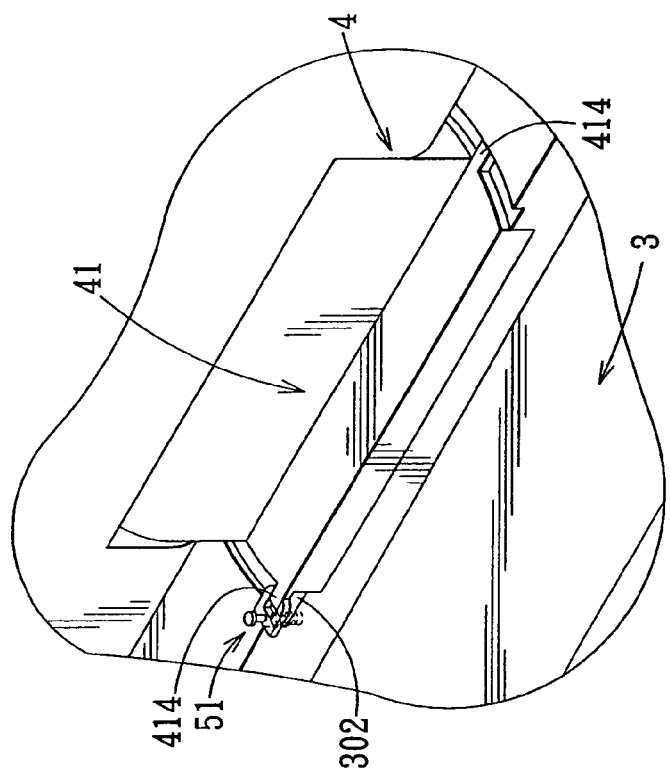
FIG. 17 is a fragmentary perspective view of a fifth preferred embodiment of the notebook computer according to this invention, which includes a spring-biased base plate with an engaging groove that is engageable with an engaging tongue formed on the rotatable part shown in FIG. 3.

FIGS. 17 and 18 illustrate a fifth preferred embodiment of the notebook computer 2 according to this invention, which has a structure modified from the first preferred embodiment shown in FIG. 2. In this embodiment, the rotatable part 41 is formed with a pair of opposing laterally extending engaging tongues 414. The stopper 51 includes a spring-biased base plate 62 that is urged by the first urging member 52, and that is formed with an engaging groove 621 which receives and engages an adjacent one of the engaging tongues 414 when the stopper 51 is positioned at the engaging position (see FIG. 17) and when the second housing 4 is positioned at one of the first and second angular positions, thereby preventing rotation of the second housing 4 about the first axis (Z). The engaging groove 621 moves away and disengages from the adjacent one of the engaging tongues 414 (see FIG. 18) when the stopper 51 is moved downwardly to the disengaging position, thereby permitting rotation of the second housing 4 about the first axis (Z). A button 61 projects upwardly from the base plate 62 through the pivot-mounting hole 302 in the upper wall 30 of the first housing 3 so as to facilitate operation of the stopper 51.

Figure 19:
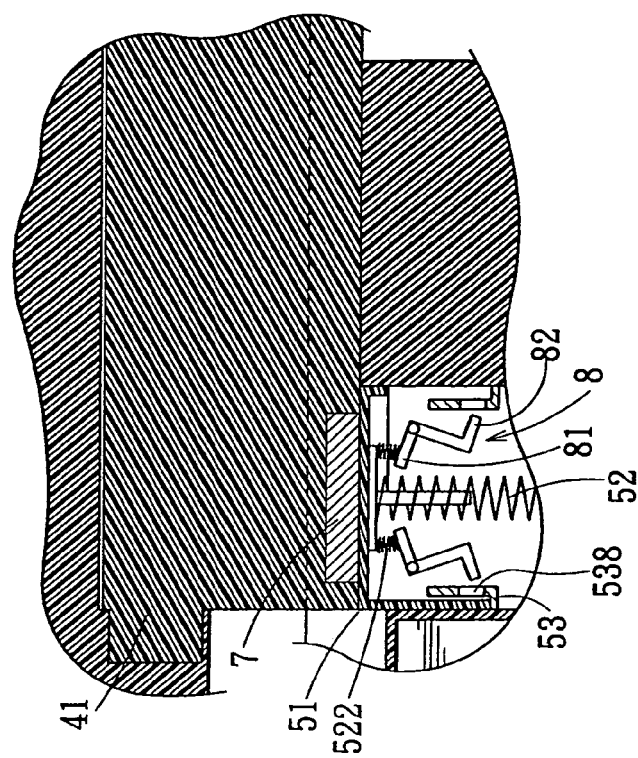
FIG. 19 is a fragmentary sectional view of a sixth preferred embodiment of the notebook computer according to this invention, which includes a magnetic latch that is engageable with a latch hole, and a magnetic block embedded in the rotatable part shown in FIG. 3.
Figure 20:
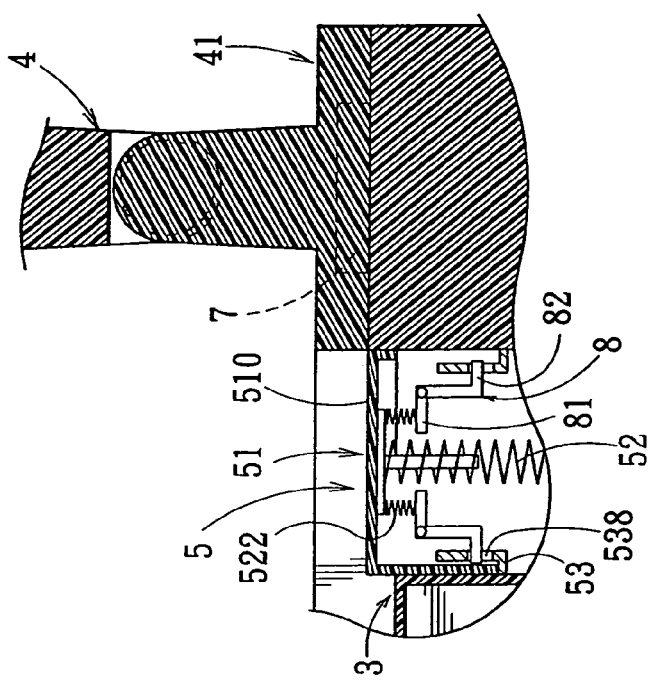
FIG. 20 is a fragmentary sectional view illustrating how the magnetic latch disengages from the latch hole by the magnetic block shown in FIG. 19.

FIGS. 19 and 20 illustrate a sixth preferred embodiment of the notebook computer 2 according to this invention, which has a structure that is similar to the first embodiment shown in FIG. 2, except that the positioning unit 5 further includes a pair of magnetic Z-shaped latches 8, each of which has two opposite ends 81, 82, and a pair of second urging members 522, each of which has two opposite ends connected to and abutting respectively against the base plate 510 and the end 81 of a respective one of the Z-shaped latch 8. The positioning unit 5 further includes a pair of lugs 53 mounted securely in the first housing 3 and disposed adjacent to the respective latches 8. Each lug 53 is formed with a latch hole 538 that receives and that engages the end 82 of a respective Z-shaped latch 8 (see FIG. 19) when the stopper 51 is positioned at the disengaging position, thereby preventing upward movement of the stopper 51 to the engaging position. A magnetic block 7 is embedded in the rotatable part 41, is offset from the Z-shaped latches 8 when the second housing 4 is positioned at one of the first and second angular positions, and is vertically aligned with the Z-shaped latches 8 when the second housing 4 moves to a middle angular position between the first and second angular positions (see FIG. 20) so as to attract each Z-shaped latch 8 to move away from the respective latch hole 538 and so as to permit disengagement of the end 82 of each Z-shaped latch 8 from the respective latch hole 538, thereby permitting upward movement of the stopper 51 to the engaging position.

Figure 21:
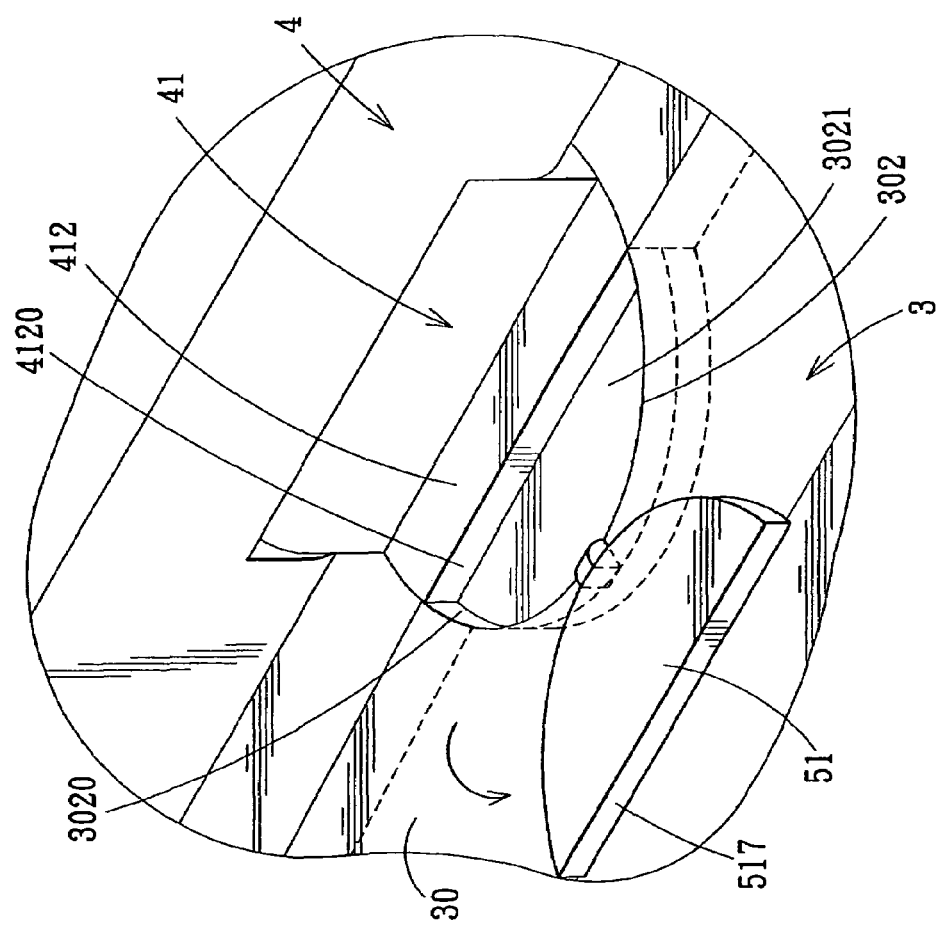
FIG. 21 is a fragmentary perspective view of a seventh preferred embodiment of the notebook computer according to this invention, which includes a stopper modified from that shown in FIG. 3.

FIG. 21 illustrates a seventh preferred embodiment of the notebook computer 2 according to this invention, which has a structure that is modified from the first preferred embodiment shown in FIG. 2. In this embodiment, the upper wall 30 of the first housing 3 is formed with a circular pivot-mounting hole 302 defined by a hole-defining wall 3020. Each engaging end 412 of the rotatable part 41 has a first engaging end face 4120 that cooperates with a segment of the hole-defining wall 3020 to confine a sector 3021 of the pivot-mounting hole 302. The stopper 51 has a second engaging end face 517 and a shape conforming to that of the sector 3021 of the pivot-mounting hole 302, and is mounted pivotally on the first housing 3 adjacent to the pivot-mounting hole 302 so as to be rotatable between an engaging position, in which the stopper 51 is received in the sector 3021 of the pivot-mounting hole 302 and in which the first and second engaging end faces 4120, 517 are in face-to-face contact with each other when the second housing 4 is positioned at one of the first and second angular positions, thereby preventing rotation of the second housing 4 and the rotatable part 41 about the first axis (Z), and a disengaging position, in which the stopper 51 is moved out of the sector 3021 of the pivot-mounting hole 302, thereby permitting rotation of the second housing 4 and the rotatable part 41 about the first axis (Z).

Figure 22:
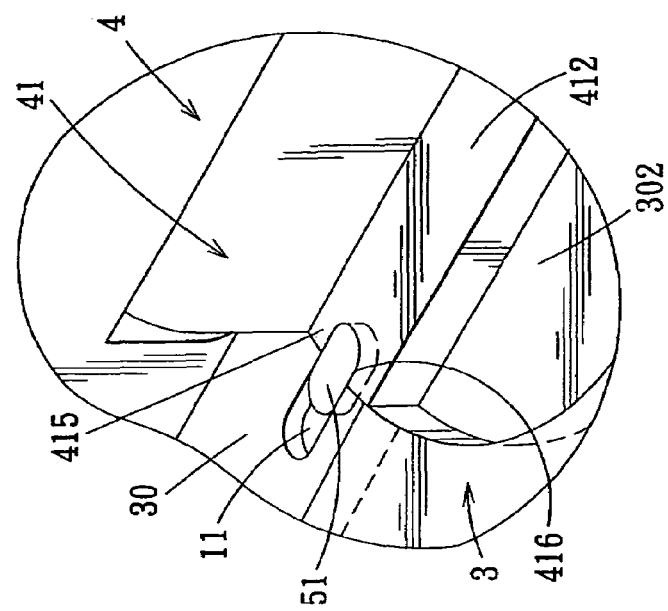
FIG. 22 is a fragmentary perspective view of an eighth preferred embodiment of the notebook computer according to this invention, which includes a stopper modified from that shown in FIG. 3.

FIG. 22 illustrates an eighth preferred embodiment of the notebook computer 2 according to this invention, which is modified from the first embodiment shown in FIG. 2. In this embodiment, the upper wall 30 of the first housing 3 is further formed with a retaining groove 11 adjacent to the pivot-mounting hole 302. Each engaging end 412 of the rotatable part 41 has two opposite ends 415, each of which is formed with an engaging groove 416 (only one is shown). The stopper 51 is slidably mounted in the retaining groove 11, and is slidable between an engaging position, in which the stopper 51 extends into and engages the engaging groove 416 in an adjacent one of the ends 415 of the rotatable part 41 when the second housing 4 is positioned at a corresponding one of the first and second angular positions, thereby preventing rotation of the second housing 4 and the rotatable part 41 about the first axis (Z), and a disengaging position, in which the stopper 51 moves out of and disengages from the engaging groove 416, thereby permitting rotation of the second housing 4 and the rotatable part 41 about the first axis (Z).

Since the stopper 51 of the positioning unit 5 of the notebook computer 2 of this invention is mounted movably on the upper wall 30 of the first housing 3, rotation of the second housing 4 about the second axis (X) to a closed position relative to the first housing 3 results in pressing and thus downward movement of the stopper 51, thereby preventing possible damage to the screen of the display module. Moreover, the aforesaid undesired rubbing between the auxiliary positioning member and the display module as encountered in the prior art can be eliminated.

With the invention thus explained, it is apparent that various modifications and variations can be made without departing from the spirit of the present invention.

We claim:

1. An electronic device comprising:
   a first housing having an upper wall and a rear end, said upper wall being formed with a circular pivot-mounting hole adjacent to said rear end of said first housing, said pivot-mounting hole being defined by a hole-defining wall;
   a pivot unit being rotatably mounted in said housing and including a rotatable part that projects upwardly through said pivot-mounting hole and that is rotatable relative to said first housing about a first axis which extends in a transverse direction relative to said upper wall of said first housing, said rotatable part having a first engaging end face that cooperates with a segment of said hole-defining wall to confine a sector of said pivot-mounting hole;
   a second housing having a rear end that is pivoted to said rotatable part so as to be rotatable relative to said first housing about a second axis which is perpendicular to said first axis and so as to be rotatable together with said rotatable part about said first axis relative to said first housing between first and second angular positions; and
   a positioning unit including a stopper that has a shape conforming to that of said sector of said pivot-mounting hole, that has a second engaging end face, and that is mounted pivotally on said first housing adjacent to said pivot-mounting hole so as to be rotatable between an engaging position, in which said stopper is received in said sector of said pivot-mounting hole and in which said first and second engaging end faces are in face-to-face contact with each other when said second housing is positioned at one of said first and second angular positions, thereby preventing rotation of said second housing and said rotatable part about said first axis, and a disengaging position, in which said stopper is moved out of said sector of said pivot-mounting hole, thereby permitting rotation of said second housing and said rotatable part about said first axis.

* * * * *